Aug. 23, 1960 S. GANGI 2,949,748
APPARATUS FOR MANUFACTURING ICE CREAM
Filed Jan. 23, 1956 2 Sheets-Sheet 1

INVENTOR
Sebastian Gangi
BY
Norman Holland
ATTORNEY

Aug. 23, 1960
S. GANGI
2,949,748
APPARATUS FOR MANUFACTURING ICE CREAM
Filed Jan. 23, 1956
2 Sheets-Sheet 2
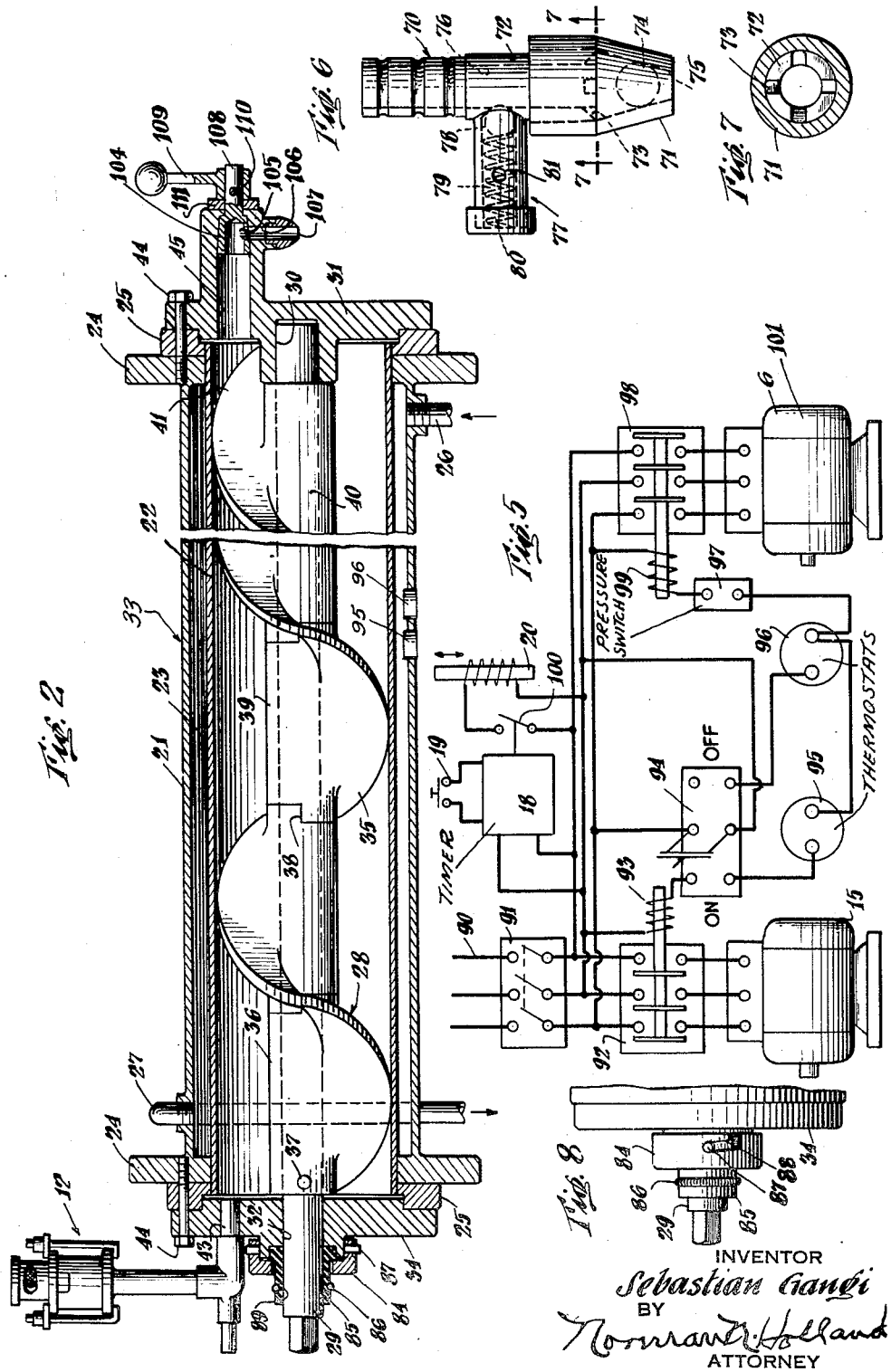
INVENTOR
Sebastian Gangi
BY
Norman T. Holland
ATTORNEY United States Patent Office 2,949,748
Patented Aug. 23, 1960

2,949,748

APPARATUS FOR MANUFACTURING ICE CREAM

Sebastian Gangi, River Edge, N.J., assignor to Cidega Machine Manufacturing Co., Inc., River Edge, N.J., a corporation of New Jersey Filed Jan. 23, 1956, Ser. No. 560,509

3 Claims. (Cl. 62—132)

The present invention relates to freezing apparatus and more particularly to a soft ice cream freezer.

Several types of soft ice cream freezers are now in use for the manufacture of a desert or refreshment commonly known as soft ice cream. Soft ice cream is made of milk which is mixed with flavoring and which is then cooled and whipped to a desired creamy consistency. Presently used machines for manufacturing soft ice cream tend to be difficult to operate as they require the operator to perform a series of steps in correct order and in carefully timed intervals. Inexperienced operators experience difficulty in using these soft ice cream machines as they tend to omit steps and to disregard the critical timing operations. This results in liquid overflows, improper mixtures, and pressure blowouts in the flexible portions of the machine piping and liquid seals. In addition, the presently used machines tend to become unsanitary and messy after use, as the various parts of these machines are not easily removed for cleaning and replacement and as threaded and other cream accumulating connections are used.

Accordingly, an object of the present invention is to provide an improved freezer.

Another object of the present invention is to provide an improved soft ice cream machine.

Another object of the present invention is to provide a soft ice cream machine which is simple to operate.

Another object of the present invention is to provide a semiautomatic ice cream machine.

Another object of the present invention is to provide a sanitary soft ice cream machine.

Another object of the present invention is to provide an easily disassembled soft ice cream machine.

Another object of the present invention is to provide an easily cleaned soft ice cream machine.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 2 is an enlarged side elevational view in section of the agitator assembly of the machine of Fig. 1;

Fig. 5 is a schematic wiring diagram for the machine of Fig. 1;

Fig. 6 is a side elevational view of the check valve;

Fig. 7 is a sectional view taken along the line 7—7 of Fig. 6; and

Fig. 8 is a fragmentary bottom plan view of the agitator showing its end bearing.

Figure 1:
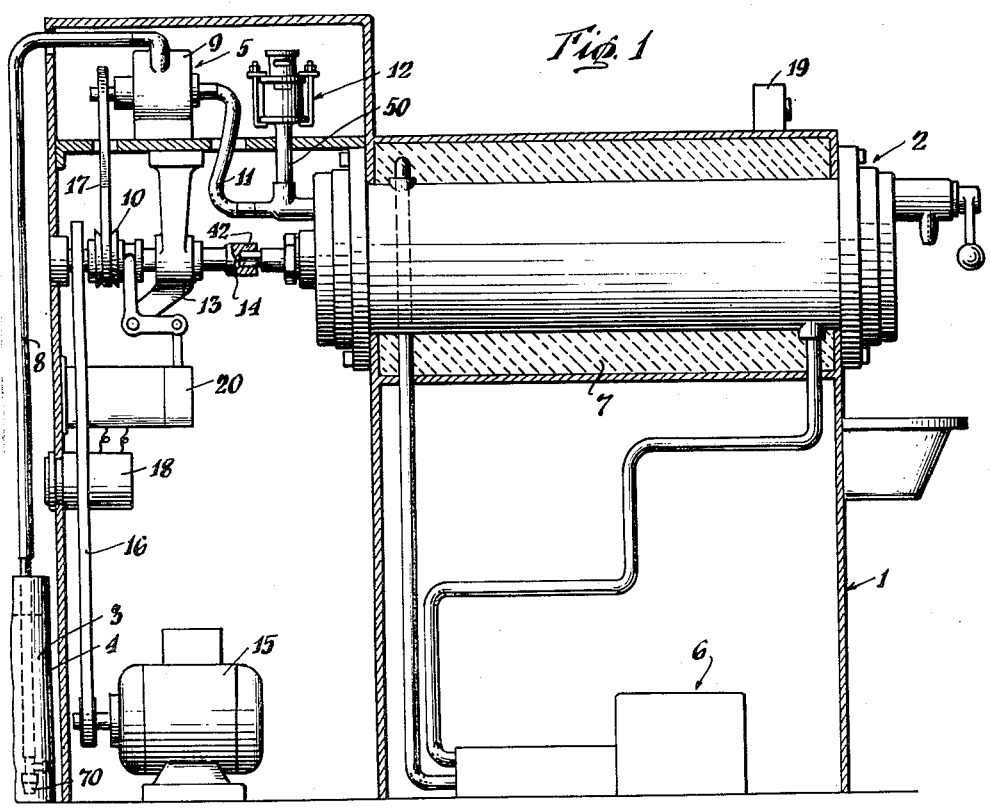
Fig. 1 is a side elevational view, with the cabinet walls cut away, of the soft ice cream machine of the present invention.

Referring to the drawings, the machine will first be described generally with particular reference to Fig. 1. The soft ice cream machine comprises an agitator assembly 2 mounted in the upper front portion of a suitable enclosing cabinet 1. The agitator assembly 2, as will be more fully explained below, whips and freezes ice cream mix into soft ice cream and dispenses it from an outlet 45 at its forward portion. The ice cream mix 3 is pumped into the rear end of the agitator assembly 2 from a suitable container 4 by a mix supply system 5 through an over-run regulator 12 which mixes a predetermined quantity of air into the mix 3 before the whipping and freezing action by the agitator assembly 2. The agitator assembly 2 is cooled during the whipping action by a refrigeration system indicated generally at 6 and which is controlled by suitable adjustable thermostats. The agitator assembly 2 is insulated by insulation 7 surrounding its outer surface.

*Mix supply system*

The ice cream mixture 3 used in the machine is supplied in a suitable container 4 into which is inserted a pump line 8 from a sanitary pump 9 to pump a predetermined amount of the mixture 3 into the agitator assembly 2. The pump 9 pumps the mix 3 through connecting line 11 and over-run regulator 12 into the agitator assembly 2. The over-run regulator 12, which will be described more fully below, admits a predetermined amount of air into the mixture 3 to aerate it and to allow the mixture to be whipped to a predetermined volume to improve its taste and appearance during the whipping action of the agitator assembly 2.

The pump 9 is driven from the rotating agitator drive shaft 14 by belt 17. In order to insure the complete filling of the agitator assembly 2 and at the same time to prevent overflow, the pump 9 operation is controlled by an automatic timer 18, which controls the pump 9 by means of a clutch 10 mounted on shaft 14. Thus, as the agitator assembly drive shaft 14 rotates, pump 9 may be started and stopped by the operation of clutch 10, which disengages belt 17. Timer 18 is preferably an adjustable, fixed-interval timer of the well-known type which when energized by control button 19, closes a contact for a given time interval and then opens it until its control button 19 is again pressed. The contacts of the timer 18 are placed in series with a power supply circuit for a clutch control solenoid 20 so that the timer contact closes and energizes the solenoid 20 for the given interval, thereby engaging clutch 10 and operating pump 9 for a sufficient period to fill the agitator assembly 2 with a predetermined volume of mix 3 from container 4.

*Agitator assembly*

The agitator assembly 2 is shown in detail in Fig. 2.

The agitator assembly 2 comprises a hollow barrel 33 having outer cylinder 21 and inner cylinder 22. Outer cylinder 21 is welded or otherwise fastened to an end flange 24. Inner cylinder 22 is tightly fitted into end flange 25, which is forced against end flanges 24. The hollow space 23 between cylinders 21 and 22 is coupled to the compressor-condenser of the refrigeration system 6 by inlet pipe 26 and outlet pipe 27, and the space 23 acts as the evaporator cooling unit for the refrigerant to cool the mix 3 in the agitator assembly 2. The spiral agitator 28 comprises rotating agitator drive shaft 29 mounted in bearing 30 in front plate 31 and bearing 32 in back plate 34. Agitator blades 35 are slidably mounted on agitator drive shaft 29. One of the agitator blades, such as back blade 36, is releasably attached to the agitator drive shaft 29 by a removable fastening, such as pin 37. The agitator blades are locked together to rotate with back blade 36 and shaft 29 by mating joints 38 on the agitator blade hubs 39. The front blade 40 preferably has an extended edge 41 adjacent the front plate bearing 30 to provide a spiral agitation action completely to the front plate 31. The agitator drive shaft 29 is removably coupled to drive shaft 14 by a coupling 42 (Fig. 1) to rotate therewith when drive shaft 14 is turned from drive motor 15 by belt 16. The rotation of agitator blades 35, 36, and 40 moves the mix 3 from its input 43 along the barrel 33 toward outlet 45. The mix is cooled by its contact with inner cylinder 22 and is also whipped to the desired consistency by the turning and driving action of the spiral agitator 28 which also thoroughly mixes the liquid ingredients of the mix 3 and the air admitted by the over-run regulator 12.

The front and back plates 31 and 34 are removably held in place on end flanges 25 by bolts 44. When bolts 44 have been removed from end flanges 24 and 25, the front plate 31 may be slipped off the barrel 33 and the agitator shaft 29. The spiral agitator 28 may now be drawn out of barrel 20 as the sliding coupling 42 allows forward axial motion of agitator shaft 29 and the agitator shaft 29 also may be drawn through bearing 32. When the agitator shaft 29 is removed, the agitator blades 35 and 40 may be slipped off for washing or replacement. Back blade 36 may be removed by loosening of the pin 37. With the agitator shaft removed, back plate 34 may be removed so that it and its attached over-run regulator 12 may be cleaned.

A preferred seal for the bearing 32 on the back plate 34 is shown in Figs. 2 and 8. The seal comprises a resilient sleeve gasket 85 surrounding and embracing the shaft 29 and held in place against back plate 34 by a removable collar 84. Collar 84 has anchoring slots 88 adapted to admit pins 87 which are set into back plate 34 and which removably hold the collar 84 in place on back plate 34 when the collar is turned so that the pins 87 engage the slots 88. In order to maintain a tight fit between the sleeve gasket 85 and shaft 29, a spring or other circular resilient member 86 is fitted around the outside of the sleeve gasket 85 in a suitable groove 89. The gasket 85 of the seal is easily released for cleaning or replacement by the removal of the collar 84 and the spring 86. The sleeve gasket 85 is preferably made of neoprene or some other sanitary and resilient material. The use of the spring 86 with the sleeve gasket 85 insures a long wearing and tight seal.

An ice cream dispenser on the end of outlet 45 comprises a hollow rotatable valve member 104 having an outlet channel 105. Outlet channel 105 cooperates with channel 106 in outlet 45 when the valve member 104 is rotated to its open position to direct the ice cream through a suitable detachable nozzle 107. Stem 108 on valve member 104 has a handle 109 attached thereto by a removable pin 110. Washer 111 is inserted between handle 109 and the end of outlet 45. The contact surface of the rotatable valve member 104 and its bearing surface on outlet 45 are preferably given complementary tapered shapes so that the pressure of the mix within the agitator assembly tends to force them together to provide a tight leakproof seal.

*Over-run regulator*

Figure 3:
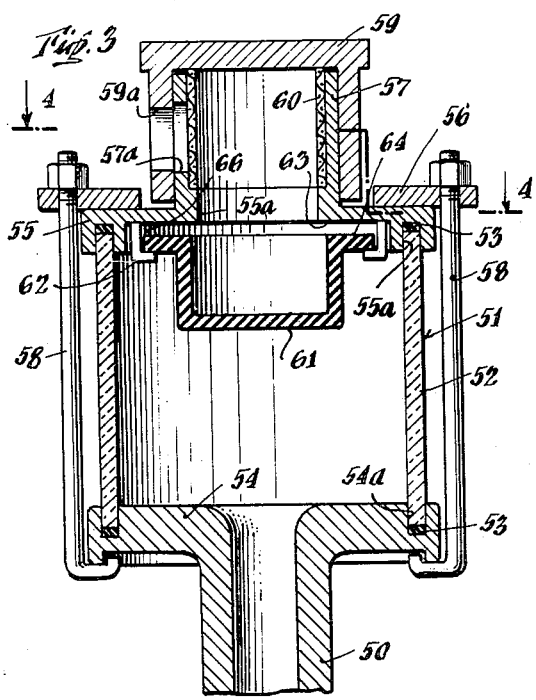
Fig. 3 is an enlarged front elevational view in section of the over-run regulator of the machine of Fig. 1.
Figure 4:
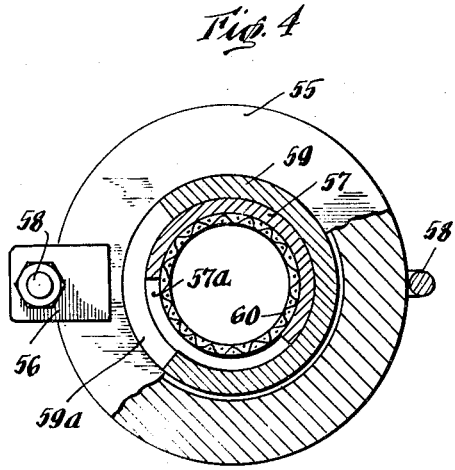
Fig. 4 is a horizontal sectional view taken along the line 4—4 of Fig. 3.

In order to provide the desired consistency and flavor typical for soft ice cream, it is necessary to mix a predetermined volume of air with the liquid mix 3. This mixing is accomplished in the machine of the present invention by the over-run regulator indicated at 12 in Fig. 1 and shown in detail in Figs. 3 and 4. The connecting line 11 passes horizontally beneath the over-run regulator 12 as it conveys the mix 3 into the agitator assembly 2. Over-run regulator 12 communicates with the horizontal portion of riser 11 by a vertical mounting pipe 50 having an adjustable air inlet and float chamber 51 mounted at its top. The air inlet and float chamber 51 is shown in detail in Figs. 3 and 4. The float chamber in the preferred embodiment comprises a transparent glass or plastic cylinder 52 mounted in grooves 54a of flared portion 54 of mounting pipe 50. A top 55 held down by bolts 58 anchors cylinder 52 in place in grooves 55a. Top 55 mounts an air inlet which admits air to the mix 3 being pumped through riser 11 into the barrel 33. The air inlet comprises a raised collar 57 on top 55 having an aperture 57a therein. A slidably fitted rotatable top 59 is fitted on collar 57, and it has an aperture 59a corresponding in size generally with aperture 57a. The volume of air entry to pipe 50 through aperture 55a in top 55 is controlled by rotating top 59 on collar 57 to adjust the coincidence of apertures 57a and 59a and to thereby set the size of the opening formed by the overlapping portions of the two apertures 57a and 59a. A screen 60 slidably fitted in collar 57 protects the air opening in order to filter the air entering the over-run regulator. The over-run regulator may be easily disassembled by removing bolts 58 and by slipping the other portions apart.

In order to prevent an unintentional overflow of the mix during the filling operation, an automatic shut-off valve is provided in the over-run regulator 12. The valve comprises a float 61 loosely contained by pins 62 below a valve seat 63 in top 55. When the mix rises to the top of cylinder 52, the float 61 rises so that its upper surface 64 contacts valve seat 63 and prevents the upward flow of the mix 3 through the air inlet apertures. When the float 61 is in its lower position, air passes freely around its edges 66. Preferably, the float 61 is made of Neoprene or some other similar material to provide a long-wearing and sanitary float member. Preferably the connection between vertical mounting pipe 50 and connecting pipe 11 is a removable friction fit without threads or other grooves so that it is detachable and easily cleanable.

*Check valve*

In order to assure a predetermined quantity of mix 3 being pumped into the agitator barrel 33 and in order to insure efficient pump operation, it is desirable to keep the lines 8 and 11 full of mix between pumping cycles. This is accomplished by the check valve 70 mounted on the lower end of the tube 8, which is inserted in the mix container 4. The check valve 70 is shown in detail in Fig. 6. Check valve 70 has a nozzle portion 71 frictionally attached to its hollow body 72. A ball 74 is loosely fitted within nozzle portion 71 so that it is lifted clear of the nozzle input 75 when the pump is in operation to allow mix 3 to flow upwardly through nozzle portion 71 and through channel 76 of body 72 to tube 8. Grooves 73 in the walls of the body 72 admit the mix from nozzle input 75 to channel 76. When the pump 9 is stopped, the downward force of the mix 3 in the check valve 70 seats ball 74 against the nozzle input 75 to prevent backflow. In order to prevent the build-up of excess pressure in the pumping system, a relief valve 77, which communicates with channel 76, is mounted on the side of the check valve body 72. A ball 78 is held in the relief valve channel 79 by a compressed spring 80 to keep the relief valve closed for normal pressures. When excess pressures are present, they force the ball 78 outwardly against spring 80 so that the relief opening 81 is cleared, allowing mix 3 to escape through channel 79 and relief opening 81, thereby reducing the pressure.

*The electrical system*

The electrical system for the soft ice cream machine is shown in Fig. 5. The electric power is supplied from a suitable three-phase power source indicated at 90, where three-phase agitator and refrigerator compressor motors such as motors 15 and 101, respectively, are used. If desired, a single-phase power source may be used with single-phase motors.

The agitator motor 15 and the refrigeration system compressor motor 101 are connected through magnetic switches or relays 92 and 98, respectively, and a power switch 91 to the power source 90.

Relay 92 controls the stopping and starting of the agitator motor 15 through the operation of the agitator control switch 94. Agitator control switch 94 in its On position connects the solenoid 93 of relay 92 across one phase of the supply line to thereby close the contacts of relay 92.

Relay 98 controls the operation of the refrigeration system 6 motor 101 to thereby control the temperature of the agitator assembly 2. The solenoid 99 of relay 98 is connected in series with a thermostatic control 95, 96, agitator control switch 94 and pressure control 97 and this series connection is connected across one phase of the power supply. Pressure control 97 is a conventional compressor cut-off control which operates to open the solenoid 99 circuit and to thereby open relay 98 to cut off motor 101 should the compressor pressure become excessive.

The thermostatic control comprises two separate thermostats 95 and 96 which are selectively connected into the relay solenoid 99 circuit by the agitator switch 94 to provide a dual temperature system which will now be more fully described.

When the spiral agitator 28 is being turned during normal usage, the agitator assembly is maintained at a given temperature to produce ice cream of a desired consistency. When the agitator switch 94 is in its On position, one pole is used to energize the motor control relay 92 and the other pole is used to connect the first thermostat 95 into the compressor motor 101 control relay 98 circuit. This thermostat 95 is set to maintain the agitator assembly temperature at the normal running temperature. When the agitator switch 94 is turned to the Off position, one pole is used to connect the second thermostat 96 in the compressor motor 101 control relay 98 circuit in place of thermostat 95. The second thermostat 96 is set to maintain the ice cream mix at the correct temperature while the spiral agitator 28 is idle. Thus, the temperature of the agitator assembly 28 is automatically controlled by the agitator motor control switch 94.

The automatic pump control for pumping a predetermined amount of mix 3 into the agitator assembly 2 is shown at the top of Fig. 5. Timer 18 is connected across one phase of the power supply. When button 19 of the timer is pressed, timer 18 closes its contacts 100 for a given interval, thereby connecting the clutch control solenoid 20 across the power line. The armature of solenoid 20 moves upwardly to engage clutch 10 so that belt 17 and connected pump 9 are operated for the given time interval by the rotating agitator drive shaft 14.

*Operation*

With the machine assembled as indicated in Fig. 1, the soft ice cream manufacturing operation is commenced by inserting tube 8 into container 4, which is filled with a suitable supply 3 of liquid mix. The agitator motor 15 is now energized by closing the power switch 91 and by turning the agitator motor switch 94 to its On position to commence the rotation of the drive shaft 14. The timer 19 has previously been set to operate for a given interval when energized, and this interval has been calculated to allow for the filling of the agitator barrel 33 to a desired liquid level. The timer control button 19 is now pressed so that solenoid 20 is energized, thereby engaging clutch 10 so that the drive shaft 14 turns the pump 9 through clutch 10 and belt 17 for the pre-set timer interval. Pump 9, during this interval, forces a given volume of the mix 3 into the agitator barrel. Should the agitator assembly 2 become overfilled and mix rise in the over-run regulator 12, the float 61 in the over-run regulator 12 seals off the air inlet 57a, 59a to prevent spillage while the relief valve 77 on check valve 70 operates to prevent excess pressure in the mix supply system 5.

As described above, the over-run regulator 12 mixes a predetermined volume of air with the mix 3 as it passes through the horizontal portion of the connector pipe 11. Top 59 of over-run regulator 12 has previously been adjusted to fix the size of the air inlet 57a, 59a to control the volume of air which is combined with the mix 3. When the timer 18 reaches the end of its pre-set interval, it de-energizes the solenoid 20, thereby disengaging the clutch 10 and stopping the pump 9.

The adjustable thermostat 95 is set to cool the agitator barrel 33 to a desired temperature while the spiral agitator is operating, and the thermostat 96 is set to maintain a desired temperature while the agitator is idle, as more fully described above. With the agitator motor 15 switched On, the rotating spiral agitator 28 agitates the mixture within the barrel 33 to thereby thoroughly mix the air from the over-run regulator with the fluid mixture, to whip the aerated mixture, to move the mixture over the cooling surface of the inner cylinder 22, and to force the cooled mixture forward by the screw action of the blades toward the outlet 45. The ice cream mixture is withdrawn from the outlet 45 as desired..

At the completion of a run, it is important, as with all food manufacturing devices, to clean the machine before it is re-employed to prevent the accumulation of stale-product and other bacteria-breeding deposits. The machine is disassembled for cleaning by removing the bolts 44 from the front flange 24 and thereafter removing the front plate 31. If desired, the valve mechanism within the front plate may be easily disassembled for cleaning. After the front plate 31 has been removed, the agitator shaft 29 may be slipped out of the barrel 33, and the agitator blades may be slipped off the shaft 29. With the shaft 29 removed, back plate 34 may be readily removed by loosening its fastening bolts 44. The over-run regulator 12 may be completely disassembled by removing the two bolts 58 and sliding the other friction-fitted portions apart. A reverse procedure is followed to assemble the machine after the cleaning has been completed.

It will be seen that the present invention provides an improved soft ice cream freezer. The freezer has a semi-automatic operation, which results in a more uniform product and which also adapts the machine for use by relatively inexperienced operators. Liquid overflows, overfilling, and the pressure blowouts are eliminated by the improved and semi-automatic filling and mixture control apparatus.

In addition, a soft ice cream machine is provided which is more sanitary in use due to the elimination of threaded connections in its mixture handling system and also due to the relative simplicity of the various parts of the ice cream mixture pumping and whipping parts.

The machine is also easily cleaned, and the parts are leakproof in use while at the same time being readily disassembled for cleaning purposes. An efficient spiral agitator is provided which may be easily disassembled from a single unitary assembly into a group of relatively small and easily handled elements which, thus, may be easily cleaned and sterilized.

The over-all machine is relatively easily manufactured and assembled and has an attractive appearance so that it may be located at the ice cream dispensing point in full view of the customer.

The automatic dual temperature control provided in the machine provides a more uniform ice cream product and at the same time increases the efficiency and reduces the operating costs of the machine.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In an ice cream freezing device having a refrigerated hollow barrel and an agitator means in the refrigerated hollow barrel adapted to whip an ice cream mix into an air-filled ice cream, the combination of a source of ice cream mix positioned below the refrigerated hollow barrel, a supply line having one end connected to said source of ice cream mix and another end coupled to the refrigerated hollow barrel, a suction pump connected to said supply line and positioned at a higher level than said source adapted intermittently to lift ice cream mix from said source to the refrigerated hollow barrel, an over-run regulator above the level of the top of the refrigerated hollow barrel comprising a hollow chamber connected to said supply line intermediate said pump and the refrigerated hollow barrel and having an adjustable air inlet in its upper portion to admit air to said ice cream mix in said supply line, and valve means in said hollow chamber adapted to be activated by ice cream mix flowing into said chamber from said supply line to close said air inlet and thereby prevent spillage of ice cream mix out of the air inlet when the refrigerated hollow barrel is filled with ice cream mix and the ice cream mix rises above a predetermined level in said hollow chamber.

2. The combination as claimed in claim 1 in which said valve means comprises a float positioned in said hollow chamber and adapted to be moved into contact with said air inlet by ice cream mix flowing into said hollow chamber from said supply line to thereby seal off said air inlet.

3. The combination as claimed in claim 1 in which said hollow chamber comprises a transparent chamber whereby the hollow chamber provides a visual indicator of the filling of the refrigerated hollow barrel and the subsequent rising of the ice cream mix in said over-run regulator.

References Cited in the file of this patent

UNITED STATES PATENTS

| | | |
|---|---|---|
| 387,961 | Ryan | Aug. 14, 1888 |
| 1,159,518 | Maul | Nov. 9, 1915 |
| 1,397,780 | Pohl | Nov. 22, 1921 |
| 1,602,647 | Carr | Oct. 12, 1926 |
| 1,957,522 | Bowman | May 8, 1934 |
| 2,067,683 | Routh | Jan. 12, 1937 |
| 2,211,387 | Routh | Aug. 13, 1940 |
| 2,253,842 | Brotman | Aug. 26, 1941 |
| 2,278,340 | Weinreich | Mar. 31, 1942 |
| 2,402,931 | Thomas | June 25, 1946 |
| 2,536,340 | Alikonis | Jan. 2, 1951 |
| 2,542,141 | Horton | Feb. 20, 1951 |
| 2,559,032 | Tacchella | July 3, 1951 |
| 2,560,664 | Sammy | July 17, 1951 |
| 2,659,206 | Carlson | Nov. 17, 1953 |
| 2,687,019 | Swenson | Aug. 24, 1954 |
| 2,689,113 | Merrill | Sept. 14, 1954 |
| 2,735,276 | Thompson | Feb. 21, 1956 |
| 2,737,024 | Swenson | Mar. 6, 1956 |

FOREIGN PATENTS

| | | |
|---|---|---|
| 494,346 | Canada | July 14, 1953 |